T. A. EDISON.
Circuits for Chemical Telegraphs.
No. 147,314. Patented Feb. 10, 1874.
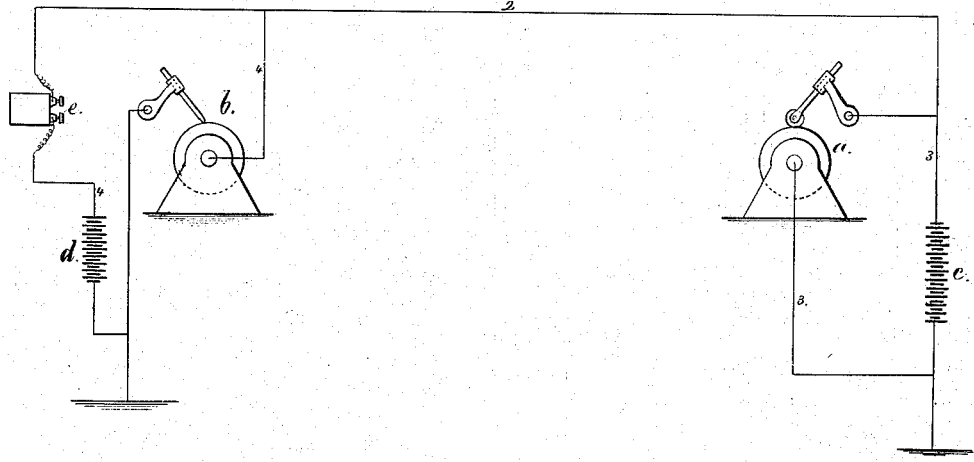

UNITED STATES PATENT OFFICE.

THOMAS A. EDISON, OF NEWARK, NEW JERSEY, ASSIGNOR TO HIMSELF AND GEORGE HARRINGTON, OF WASHINGTON, D. C.

IMPROVEMENT IN CIRCUITS FOR CHEMICAL TELEGRAPHS.

Specification forming part of Letters Patent No. 147,314, dated February 10, 1874; application filed July 29, 1873.

CASE 77.

*To all whom it may concern:*

Be it known that I, THOMAS A. EDISON, of Newark, in the county of Essex and State of New Jersey, have invented an Improvement in Circuits for Chemical Telegraphs, of which the following is a specification:

This invention is for use in automatic telegraphing in which perforated paper is employed in transmitting, and chemical paper in receiving, the message.

The receiving and transmitting instruments are in shunt-circuits from the main line, and in each circuit there is a battery. These batteries act in opposition to each other, and produce no effect at the receiving-instrument when the shunt-circuit is broken at the transmitter. When this circuit is closed, the current from the battery of the transmitter is short-circuited, and does not pass over the line. This destroys the balance of electrical tension, and the battery at the receiving end of the line acts upon the chemical paper and makes the mark.

In the diagram, the transmitting-instrument is represented at $a$, and the receiving-instrument at $b$, and these are of usual character for transmitting by perforated paper, and receiving by chemical paper. The transmitter is in the circuit 3 to the battery $c$, and the receiver is in a circuit, 4, to the battery $d$, and the main line 2 is connected to these circuits, 3 and 4. The poles of the batteries $c$ $d$ are placed so that said batteries oppose each other, and when the strip of perforated paper intervenes between the stylus and drum of the transmitter the circuit 3 is broken, and the current from the battery $c$, over the line 2, and through the receiving-instrument $b$ to the earth, is equaled by the current from the battery $d$, and hence no mark is made upon the chemical paper of the receiving-instrument $b$. The rheostat $e$ is introduced in the shunt-circuit 4, and should be adjustable, so that the electric energy from the battery $d$ may balance that from the line 2, and prevent decomposition in the chemical paper.

When the stylus or roller of the transmitter enters a perforation in the strip of paper, then the short circuit 3 from the battery $c$ is closed, and the electricity passes but little upon the line 2. The battery $d$ is now unbalanced, and its current, passing by the circuit 4 through the stylus of the receiver, makes the mark upon the chemical paper.

I claim as my invention—

The circuit 4 from the battery $d$, in which the receiving-instrument $b$ is placed, in combination with the opposing-line circuit 2 and the shunt-circuit 3 at the receiving-instrument, in which are placed the transmitting-instrument and battery, as and for the purposes set forth.

Signed by me this 24th day of March, A. D. 1873.

THOMAS A. EDISON.

Witnesses:
GEO. T. PINCKNEY,
CHAS. H. SMITH.